Jan. 26, 1960     G. OESTREICHER     2,922,383
UNIVERSAL JOINT SHAFT DRIVE FOR TWO AND MORE AXLE TRUCKS
Filed April 20, 1955     9 Sheets-Sheet 1

FIG.1

INVENTOR
Georg Oestreicher
By
Patent Agent

Jan. 26, 1960  G. OESTREICHER  2,922,383
UNIVERSAL JOINT SHAFT DRIVE FOR TWO AND MORE AXLE TRUCKS
Filed April 20, 1955  9 Sheets-Sheet 4

FIG.5

INVENTOR
Georg Oestreicher
By
Patent Agent

Jan. 26, 1960 G. OESTREICHER 2,922,383
UNIVERSAL JOINT SHAFT DRIVE FOR TWO AND MORE AXLE TRUCKS
Filed April 20, 1955 9 Sheets-Sheet 8

FIG.1a

INVENTOR
Georg Oestreicher
By
Patent Agent

United States Patent Office 2,922,383
Patented Jan. 26, 1960

2,922,383

UNIVERSAL JOINT SHAFT DRIVE FOR TWO AND MORE AXLE TRUCKS

Georg Oestreicher, Koln-Deutz, Germany, assignor to Klockner-Humboldt-Deutz Aktiengesellschaft, Koln, Germany Application April 29, 1955, Serial No. 502,598

Claims priority, application Germany April 30, 1954

10 Claims. (Cl. 105—108)

The present invention relates to universal joint shaft drives for two or more axle trucks.

Substantially two types of trucks with wheel axles driven by universal joint shafts are known. The drawback of one of these known constructions according to which the transmission or distributing gear system is fixedly connected to the chassis of the vehicle equipped with the trucks consists in that when the Cardan shaft is driven at constant speed while the vehicle drives through a curve, the output speed of said shaft fluctuates periodically in the manner of a sine graph so that also the torque fluctuates accordingly. Therefore, all driving parts are subjected to shock-like alternating stresses which considerably reduce the useful life of the driving parts and may even cause the same to break.

The other known arrangement, according to which the transmission or distributing gear system is connected to the truck, has the same drawback as outlined above.

It is, therefore, an object of the present invention to provide a universal joint shaft drive for two or more axle trucks, which will overcome the above mentioned drawback.

It is another object of this invention to provide a universal joint shaft drive for two or more axle trucks according to which the universal joint shaft angles at the input and output end of the universal joint shafts will equal each other regardless of the turning movements of the trucks during the driving through a curve, which turning movements have to be followed by the universal joint shafts.

It is still another object of this invention to provide a universal joint shaft drive in conformity with the two preceding paragraphs, in which the turning movements of the trucks will not result in a fluctuation of the torque so that the driving parts will not be subjected to shock-like alternating stresses.

These and other objects and advantages of the invention will appear more clearly from the following specification in connection with the accompanying drawings in which.

General arrangement

The drawbacks outlined above of the heretofore known constructions for universal joint shaft drives for two or more axle trucks have been overcome according to the present invention by arranging a universal joint shaft in such a manner that the center thereof in longitudinal direction of said shaft is located on the axis of rotation of the truck relative to the remainder of the vehicle, while one flange at one end of said universal joint shaft is connected with the driving shaft whereas another flange at the other end of said universal joint shaft is connected with a hollow shaft concentrically surrounding said universal joint shaft. The said hollow shaft is journalled in a casing which may be fixedly connected either to the truck or to at least one of the driving axles. Mounted on said hollow shaft, preferably within the transverse central plane of the truck or symmetrically thereto are arranged gears or the like which serve to receive and convey the driving power to the driving axles.

If a two-axle truck is employed, according to the invention, one gear, preferably within the central plane of the truck transverse to the longitudinal direction of the hollow shaft is arranged on the hollow shaft and meshes with a second gear preferably located below said first gear. This second gear is journalled in the same casing as the hollow shaft and has both ends of its shaft provided with a connecting flange for conveying the driving power to the two driving axles.

When a three-axle truck is employed, of which the two outer axles only are driven, it is advantageous to mount two gears on said hollow shaft and respectively to arrange the same on both sides of the central plane of the truck which is located transverse to the longitudinal direction of the hollow shaft. Said two gears are preferably arranged at even distance from said central plane. The said gears respectively mesh with further gears preferably arranged therebelow. The said last mentioned two gears are journalled in the same casing as the hollow shaft, said casing preferably being connected to said truck. The shafts of said last mentioned two gears have their outer ends provided with a connecting flange for the drive of the outer driving axles pertaining thereto, while the central axle rotates in corresponding recesses of the said casing.

When a three-axle truck is employed with three driving axles, the arrangement set forth in the preceding paragraph is modified in such a manner that the shaft of one of the two gears arranged for driving one of the outer driving axles has its other end provided with a bevel gear which meshes with a bevel wheel. The said bevel wheel is mounted on the central portion of the intermediate driving axle, while the casing for journalling the hollow shaft and the gears with output flanges is journalled on said axle.

According to a particularly advantageous arrangement for a three-axle truck with three driving axles, the casing for the journalling of the hollow shaft and the gears with output flanges is connected to the truck, while the bevel wheel for the drive of the central driving axle is arranged on a hollow shaft surrounding said central driving axle. The said hollow shaft surrounds said central driving axle concentrically with a play corresponding to the spring deflection of said central axle. The hollow shaft is journalled in the casing and is drivingly connected in a manner known per se with the central driving axle by the well known Alsthon drive referred to in detail later.

Structural arrangement

Figure 1:
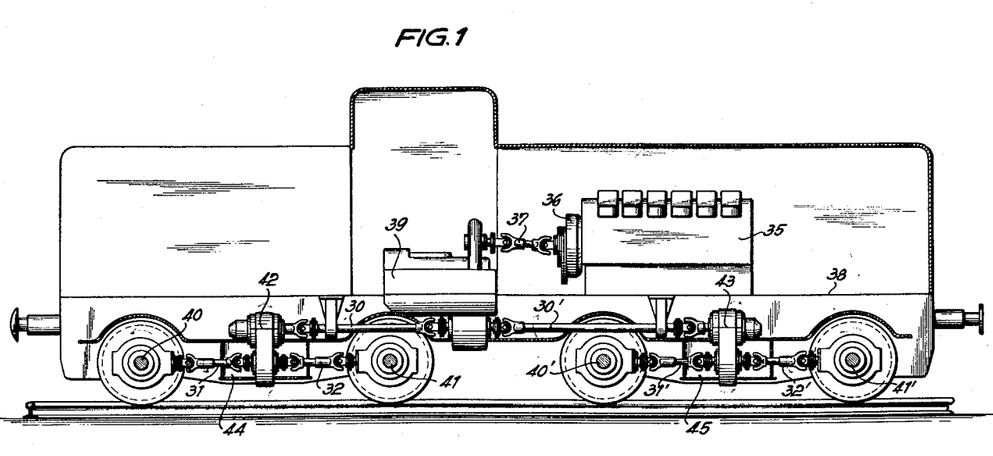
Fig. 1 illustrates a vehicle equipped with a universal joint shaft drive according to the invention for two-axle trucks.

Referring now to the drawings in detail and Fig. 1 thereof in particular, the railroad car shown in Fig. 1 and provided with a universal joint shaft drive for two-axle trucks, comprises an internal combustion engine 35 which by means of a hydraulic coupling 36 and a universal point shaft or Cardan shaft 37 drives a transmission 39 connected to the chassis or understructure 38 of the vehicle. From the transmission 39, two Cardan shafts 30 and 30' lead to the distributing gear systems 42 and 43 of the two trucks 44 and 45 respectively. As will be seen from Fig. 1a, the distributing gear system 42 is connected to the truck 44 by the elements 46 and 47. The gear system 43 is similarly supported in the truck 45. The axle drives on the driven wheel axles 40 and 41 are designated with the reference numerals 48 and 49. These axle drives are connected with the truck 44 by means of supports 50 and 51 respectively which absorb the reaction torque of the axle drive.

Figure 1A:
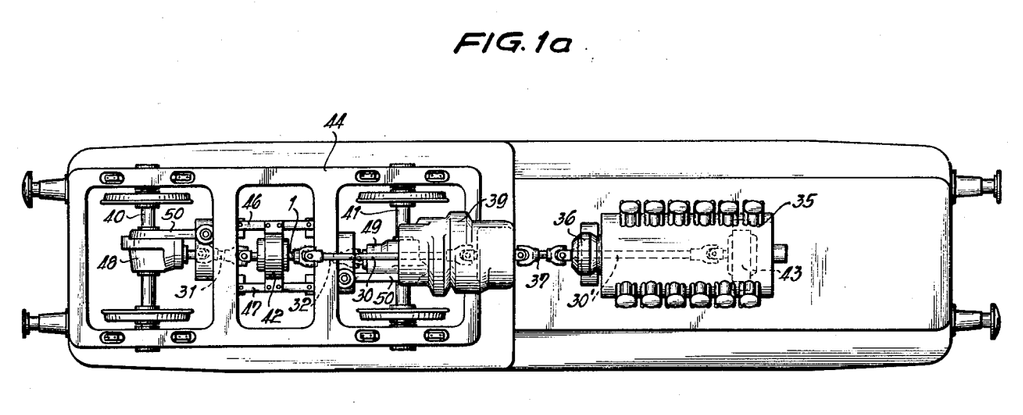
Fig. 1a is a top view of the vehicle shown in Fig. 1 with parts of the vehicle body omitted in order to show elements therebelow.

The right part of Fig. 1a shows in dash lines only the Cardan shaft 30' which leads from the transmission 39 to the distributing transmission 43 of the right hand truck 45. The remaining parts of the axle drive are identical to those of the left hand truck 44. The two distributing gear systems or transmissions 42 and 43 are of a construction shown in more detail in Fig. 2. Two Cardan shafts 31, 32 and 31', 32' respectively lead from each of the two distributing gear systems 42, 43 to the driving wheel axles 40, 41 and 40', 41' of the two trucks 44 and 45 respectively. The shafts 30, 31 and 32 are also shown more clearly in Fig. 2.

Figure 2:
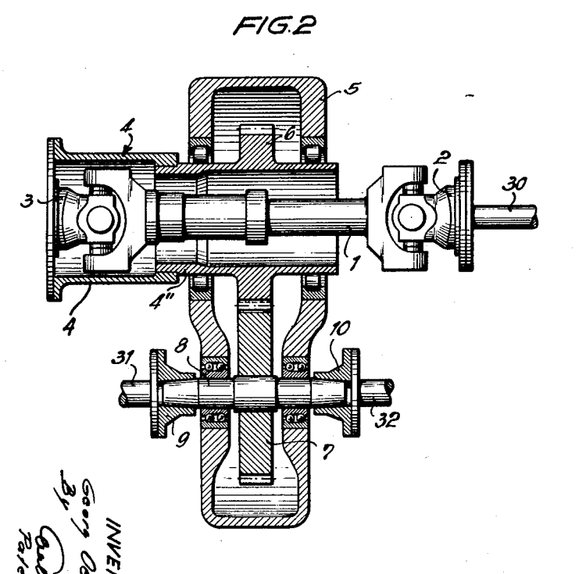
Fig. 2 is a longitudinal section through a drive according to the invention for a two-axle truck with an ordinary universal joint.
Figure 3:
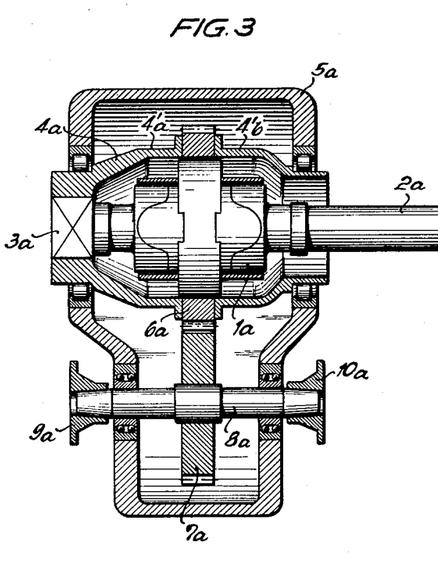
Fig. 3 is a longitudinal section through a drive according to the invention for a two-axle truck with synchronizing joint.
Figure 6:
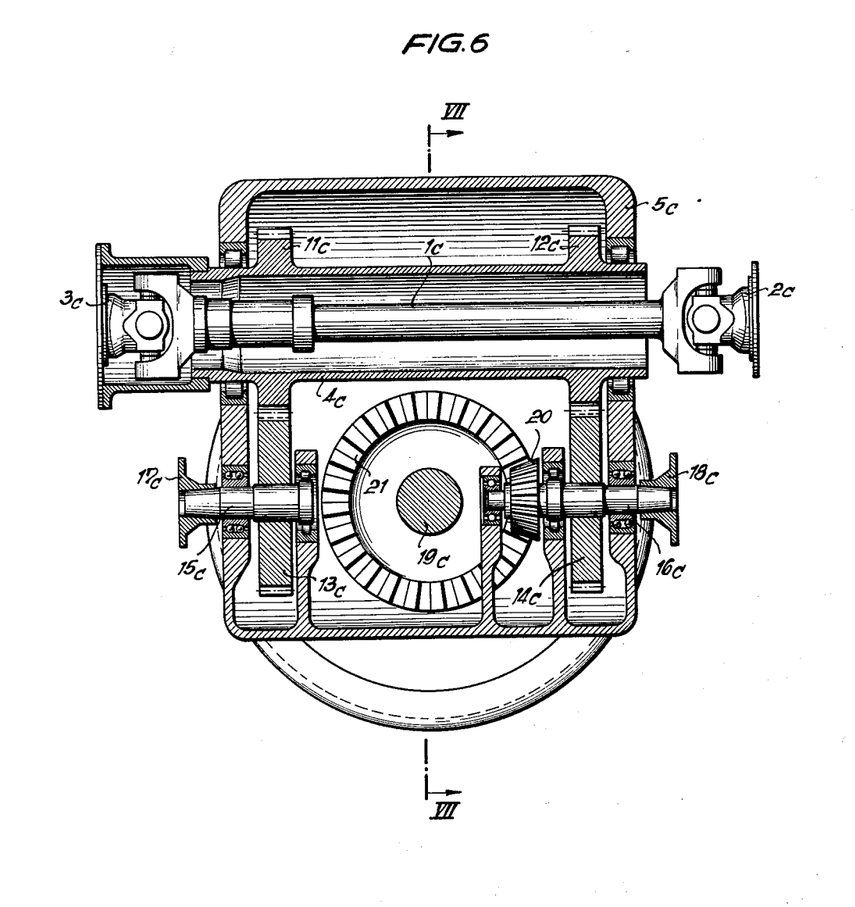
Fig. 6 is a longitudinal section through a drive according to the invention for a three-axle truck in which all three axles are driven while the driving casing is fixedly connected with at least one of the driving axles.
Figure 7:
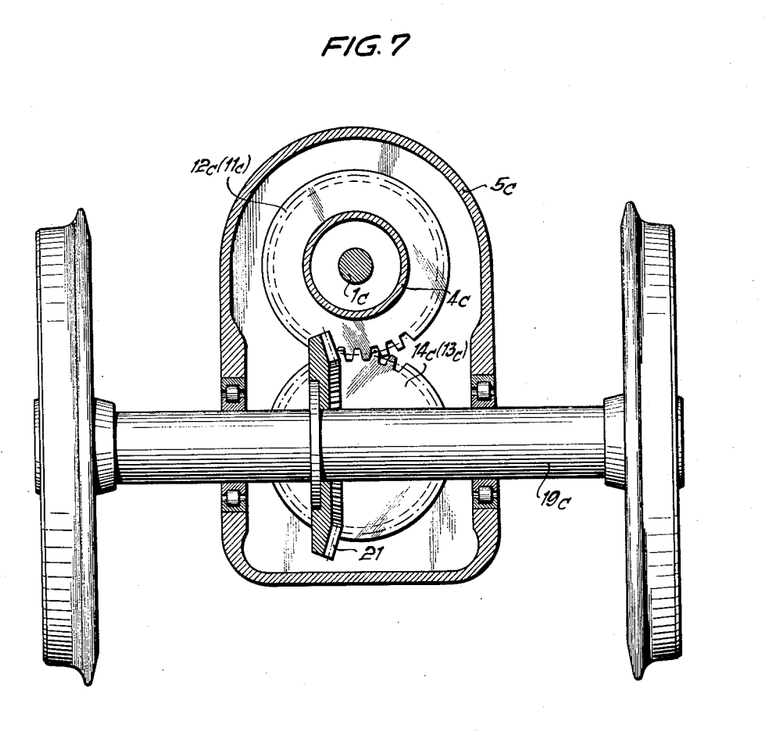
Fig. 7 is a cross section taken along the line VII—VII of Fig. 6.

Referring now to Fig. 2 it will be seen that the universal joint shaft 1 is so arranged that its central portion registers with the central portion of the truck. One end, or more specifically one flange 2, of the universal joint shaft 1 is connected with the drive shaft 30, while the other end, or more specifically the other flange 3, of the shaft 1 is connected to a hollow shaft generally designated 4. This hollow shaft 4 comprises a section 4' and a section 4" which sections are connected with each other in any convenient manner. The hollow shaft 4 concentrically surrounds the universal joint shaft 1 and is journalled in a casing 5 which is fixedly connected either with the adjacent truck as shown in Figs. 2, 3, 4, 5, 8 and 9 or is fixedly connected with at least one of the driving axles as shown in Figs. 6 and 7. According to the arrangements shown in Figs. 2 and 3 illustrating a drive for two-axle trucks, a gear 6 and 6a respectively is arranged on the hollow shaft 4 and 4a respectively substantially in the vertical central plane of the truck. The gear 6, 6a respectively meshes with a second gear 7, 7a which according to Figs. 2 and 3 is arranged below the gear 6, 6a respectively. The gear 7, 7a or its shaft 8, 8a is journalled in a casing 5, 5a fixedly connected to the truck. The shaft 8, 8a has both ends thereof provided with a flange 9 and 10 and 9a, 10a respectively for connection with the universal joint shafts 31 and 32 (Figs. 1 and 2) to convey therethrough the driving power to the driving axles.

With reference to the embodiments shown in Figs. 4 to 9, those parts of said embodiments which correspond to parts illustrated in Fig. 2 have been designated with the same reference numerals but with the affixes b, c and d respectively.

According to the embodiments of Figs. 4 to 9 showing a drive for three-axle trucks, two gears 11 and 12 are mounted on the hollow shaft 4b at equal distance from and on opposite sides of the vertical central plane of the hollow shaft 4b. Each of said two gears 11 and 12 meshes with a further gear 13 and 14 respectively arranged below said gears 11 and 12. The two gears 13 and 14 are journalled in the casing 5b.

Each of the shafts 15 and 16 of the two gears 13 and 14 has its outer end provided with a connecting flange 17 and 18 respectively for conveying the driving forces to the respective driving axle of the truck.

Figure 4:
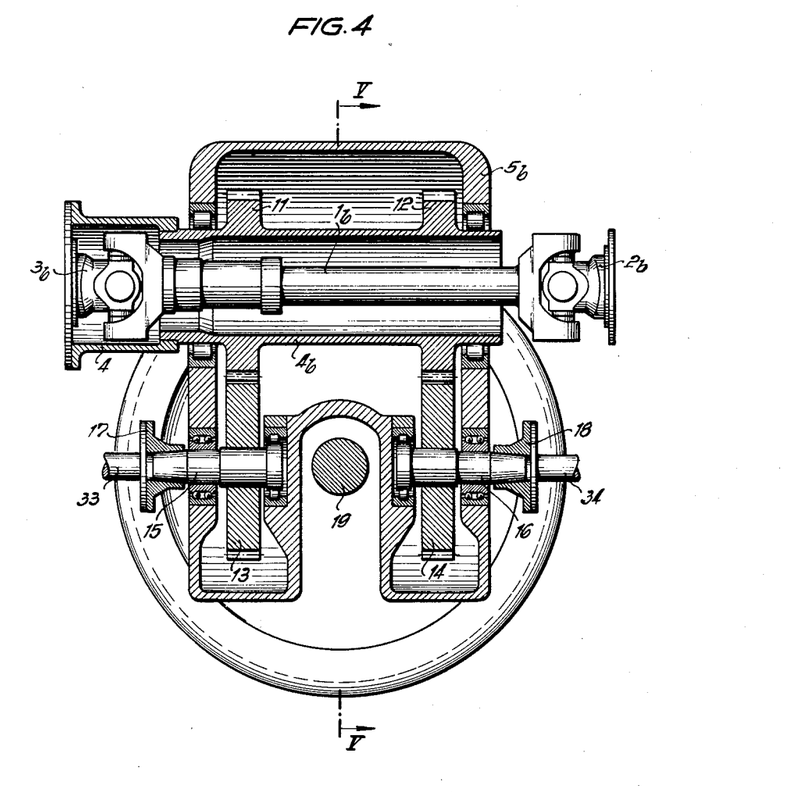
Fig. 4 is a longitudinal section through a drive according to the invention for a three-axle truck, in which the two outer axles are driven and the driving casing is fixed to the truck.
Figure 5:
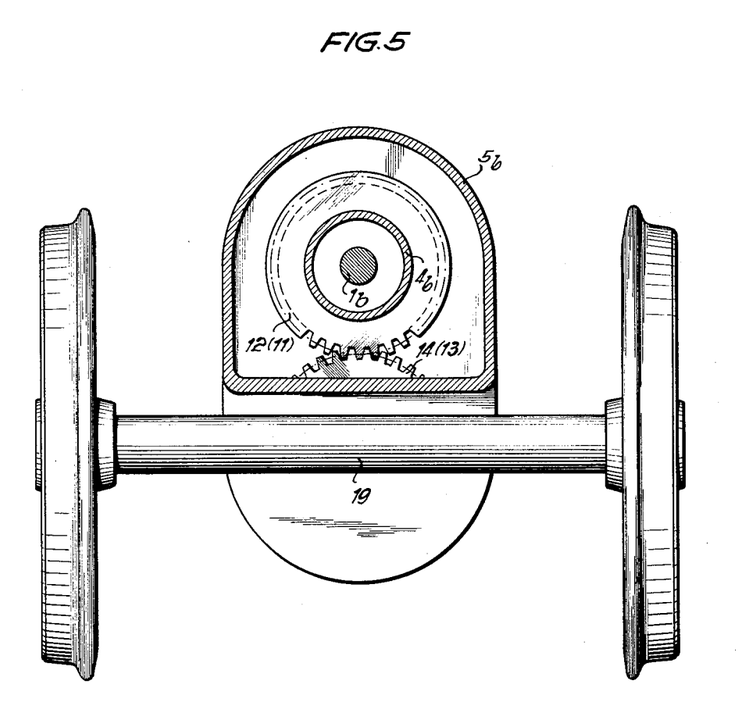
Fig. 5 is a cross section taken along the line V—V of Fig. 4.

According to the embodiment of Figs. 4 and 5, only the two outer driving axles of the truck are driven, whereas the intermediate axle 19 is not driven. The casing 5b is in this instance fixedly connected to the truck, while a corresponding recess in the casing 5b is provided for accommodating the intermediate axle 19. In this way, the said intermediate axle is allowed to undergo displacement for instance for the purpose of spring action.

The arrangement according to Figs. 6 and 7 differs from that of Figs. 4 and 5 primarily in that there is also provided a drive for the intermediate axle 19c. This drive is effected through the intervention of a bevel gear 20 which is mounted on the shaft 16c of one gear 14c and drives the bevel wheel 21 connected to the axle 19c. In this instance, the casing 5c is journalled on the central axle 19c as is clearly shown in Fig. 7.

Figure 8:
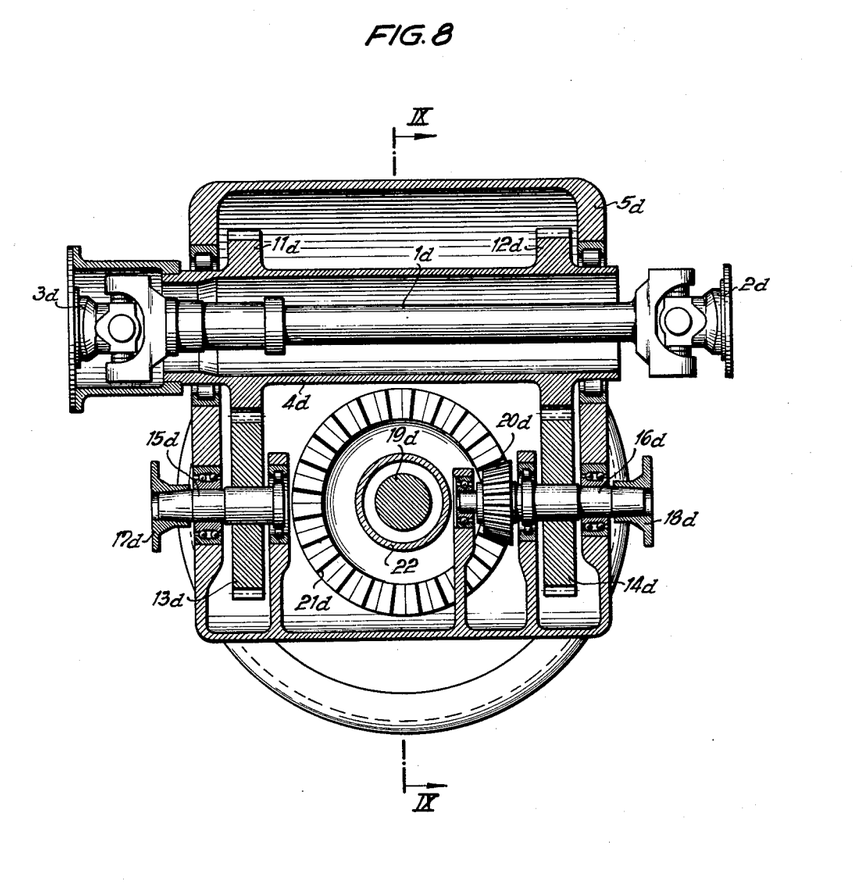
Fig. 8 is a longitudinal section through a drive according to the invention for a three-axle truck, in which all three axles are driven and the driving casing is connected to the truck.
Figures 9, 10:
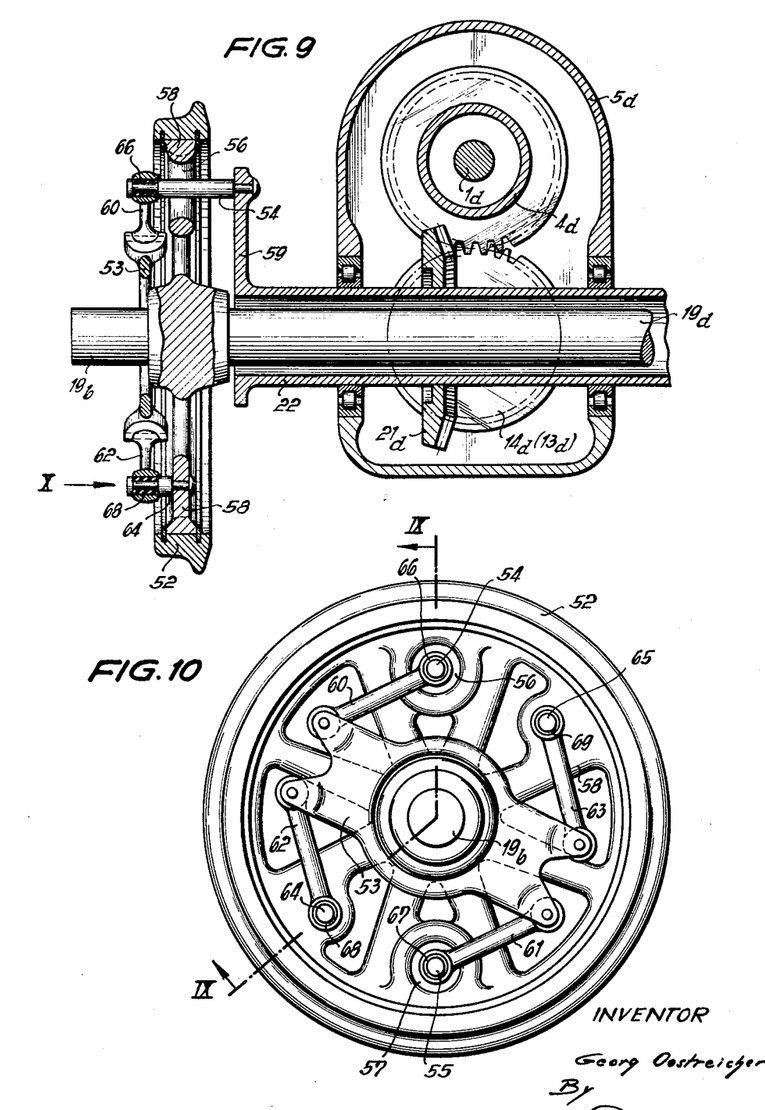
Fig. 9 is a cross section through Fig. 8 and can best be viewed as section taken along the line IX—IX of Fig. 10.
Fig. 10 is a view of Fig. 9 seen in the direction of the arrow X.

The embodiment shown in Figs. 8 and 9 differs from that of Figs. 6 and 7 in that the casing 5d having journalled therein the hollow shaft 4d and the gears 11d, 12d, 13d and 14d is not connected to the central axle but is connected to the truck. In this instance, the bevel gear 21d is not connected directly to the axle 19d but instead is connected to the hollow shaft 22 which latter is journalled in the casing 5d and surrounds the intermediate driving axle 19d in spaced relationship corresponding to the spring deflection of said axle 19d. The hollow shaft 22 is drivingly connected with the intermediate driving axle 19d in a manner known per se by the well known Alsthon drive. This drive comprises a floating ring 53 which is driven by the hollow shaft 22 through the intervention of two bolts 54 and 55. These bolts extend through cut-outs 56 and 57 in the wheel disc 58 and have their inner ends connected to a flange 59 which in its turn is connected to the hollow shaft 22. The outer ends of the bolts 54 are connected through coupling members 60 and 61 with the ring 53 which surrounds the wheel axle 19d, in spaced relationship thereto. Between the ring 53 and the wheel disc 58 there are provided two further coupling members 62 and 63 which drive the wheel disc 58 and the track ring 52 through the intervention of bolts 64 and 65 connected to the wheel disc 58. This arrangement allows any desired displacement between the wheel axle 19d and the hollow shaft 22 perpendicular to the axes of these two elements. Due to the inter-position of elastic rubber elements 66 and 67 between the bolts 54 and 55 and the coupling members 60 and 61 respectively, and due to the inter-position of rubber elements 68 and 69 between the bolts 64 and 65, and the coupling elements 62 and 63, also a certain inclination of the wheel axle 19d relative to the hollow shaft 22 and thus relative to the trucks will be possible. Such inclination will occur with unilateral unevenness of the track, which unevenness is taken up by the springs between the wheel axle 19d and the respective truck.

The drive transmission comprising the gears 6, 7, and 6a, 7a in the embodiment of Figs. 2 and 3 and comprising the gears 11, 11c, 11d, 12, 12c, 12d, 13, 13c, 13d, and 14, 14c, 14d according to the embodiment of Figs. 4 to 9 is advantageously so designed that it can easily be exchanged for another driving transmission with gears resulting in a different transmission ratio. In this way it is possible without any great expenses to adapt the universal joint drive according to the invention to different conditions of operation.

It is, of course, understood that the present invention is, by no means, limited to the particular constructions shown in the drawings, but also comprises any modifications within the scope of the appended claims.

What I claim is:

1. In combination in a vehicle truck, especially a rail vehicle truck adapted to turn about an axis of rotation relative to the frame of a vehicle and having at least two axles; a universal joint shaft having one end thereof arranged for connection with a driving shaft, a rotatable hollow shaft coaxially arranged with regard to said universal joint shaft and surrounding the same, said hollow shaft being drivingly connected to the other end of said universal joint shaft, the center of said universal joint shaft in the longitudinal direction of said shaft being located substantially on said axis of rotation of said truck, casing means supporting said hollow shaft, first gear means supported by said hollow shaft for rotation therewith, and second gear means meshing with said first gear means.

2. A universal joint shaft drive according to claim 1, in which said casing means is fixedly connected to said truck.

3. A universal joint shaft drive according to claim 1, in which said casing means is fixedly connected to at least one of the driving axles.

4. In combination in a three-axle vehicle truck with two outer axles and one intermediate axle, especially for a rail vehicle truck adapted to turn about an axis of rotation relative to the frame of a vehicle: a universal joint shaft having one end thereof arranged for connection with a driving shaft, a rotatable hollow shaft coaxially arranged with regard to said universal joint shaft and surrounding the same, said hollow shaft being drivingly connected to the other end of said universal joint shaft, the center of said universal joint shaft in the longitudinal direction of said shaft being located substantially on said axis of rotation of said truck, casing means rotatably supporting said hollow shaft, a first pair of gears arranged in spaced relationship to each other and connected to said hollow shaft for rotation therewith, a second pair of gears arranged in meshing engagement with the gears of said first pair of gears, two shaft means respectively rotatably supported by said casing means and respectively connected to the gears of said second pair of gears for rotation therewith, said shaft means being respectively arranged for connection with said outer driving axles, a first bevel gear connected to one of said shaft means for rotation therewith, and a second bevel gear rotatably connected to said intermediate axle and meshing with said first bevel gear to thereby rotate said intermediate axle in response to the rotation of said first bevel gear, said casing means being journalled on said intermediate axle.

5. In combination in a multi-axle vehicle truck, especially a rail vehicle truck adapted to turn about an axis of rotation relative to the frame of a vehicle: a universal joint shaft having one end thereof arranged for connection with a driving shaft, a rotatable hollow shaft concentrically arranged with regard to said universal joint shaft and surrounding the same, said hollow shaft being drivingly connected to the other end of said universal joint shaft, the center of said universal joint shaft in the longitudinal direction of said shaft being located substantially on said axis of rotation of said truck, casing means supporting said hollow shaft, first gear means supported by said hollow shaft for rotation therewith, and second gear means meshing with said first gear means and arranged for driving connection with at least two driving axles of said truck, said first gear means and said second gear means being exchangeably arranged within said casing means for varying the transmission ratio between said driving shaft and the axles driven by said second gear means.

6. The combination according to claim 1 wherein said second gear means is supported by shaft means rotatably connected thereto, said shaft means being provided with oppositely located connecting means for connection with two driving axles of said truck.

7. The combination according to claim 1 wherein said first gear means comprises a first pair of gears supported by and connected with said hollow shaft for rotation therewith, the gears of said first gear means being arranged on opposite sides of said axis of rotation, and wherein said second gear means comprises a pair of gears meshing with said first pair of gears, said second gear means being supported by respective shaft means drivingly connected thereto, each of said supporting shaft means having its outer end arranged for connection with a driving axle of said truck.

8. The combination according to claim 1 wherein said first gear means comprises a gear connected to said hollow shaft so as to rotate therewith, said first gear being located symmetrically with respect to said axis of rotation of said truck, and wherein said second gear means is arranged substantially below said first gear means, said second gear means being supported by and connected to shaft means for rotation therewith, said shaft means having opposite ends thereof provided with connecting means for connecting said ends with the respective driving axles of said truck.

9. The combination according to claim 1 wherein said truck is a three-axle truck having two outer driving axles and an intermediate axle, and said first gear means comprising a first pair of gears connected to said hollow shaft for rotation therewith, said first pair of gears being located symmetrically with respect to said axis of rotation of said truck, and wherein said second gear means comprises a second pair of gears supported by respective shaft means rotatably connected thereto, the outer ends of each of said shaft means being arranged for connection with one of said two driving axles of said truck, said casing means having an extension rotatably supporting said two shaft means, said extension extending around said intermediate axle of said truck.

10. The combination according to claim 1 wherein said truck is a three-axle truck having two outer driving axles and an intermediate axle, and wherein said first gear means comprises a first pair of gears connected to said hollow shaft and arranged in spaced relationship to each other, and wherein said second gear means comprises a second pair of gears, supported by respective shaft means rotatably connected thereto, said last named shaft means being respectively arranged for connection with the outer driving axles of said truck, a bevel gear connected to one of said last named shaft means for rotation therewith, an additional hollow shaft coaxially arranged with regard to the intermediate axle of said truck and having its inner wall spaced from the outer surface of said intermediate axle by a distance greater than the possible spring deflection of said intermediate axle, said additional hollow shaft being rotatably journalled in said casing means, and a bevel gear wheel connected to said additional hollow shaft for rotation therewith and meshing with said bevel gear.

References Cited in the file of this patent

UNITED STATES PATENTS

| | | |
|---|---|---|
| 1,544,574 | Guernsey | July 7, 1925 |
| 1,593,531 | Guernsey | July 20, 1926 |
| 2,024,688 | Gray | Dec. 17, 1935 |
| 2,636,449 | Kuhr | Apr. 28, 1953 |